(12) United States Patent
Natta et al.

(10) Patent No.: US 12,220,949 B2
(45) Date of Patent: *Feb. 11, 2025

(54) TYRE FOR MOTOR-CYCLES COMPRISING A MONITORING DEVICE

(71) Applicant: Pirelli Tyre S.p.A., Milan (IT)

(72) Inventors: Andrea Natta, Milan (IT); Cristiano Puppi, Milan (IT); Ivan Gildo Boscaino, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 199 days.

This patent is subject to a terminal disclaimer.

(21) Appl. No.: 17/756,695

(22) PCT Filed: Dec. 14, 2020

(86) PCT No.: PCT/IT2020/050307
§ 371 (c)(1),
(2) Date: May 31, 2022

(87) PCT Pub. No.: WO2021/124366
PCT Pub. Date: Jun. 24, 2021

(65) Prior Publication Data
US 2023/0001753 A1    Jan. 5, 2023

(30) Foreign Application Priority Data
Dec. 19, 2019   (IT) .................. 102019000024691

(51) Int. Cl.
*B60C 23/04*   (2006.01)
(52) U.S. Cl.
CPC ........ *B60C 23/0493* (2013.01); *B60C 23/041* (2013.01)

(58) Field of Classification Search
CPC ............ B60C 23/0408; B60C 23/0496; B60C 23/061; B60C 23/0494; B60C 23/0416;
(Continued)

(56) References Cited

U.S. PATENT DOCUMENTS 4,334,215 A    6/1982   Frazier et al.
4,862,486 A    8/1989   Wing et al.
(Continued)

FOREIGN PATENT DOCUMENTS

DE    102005016354 A1    10/2006
DE    102007014097 A1    9/2008
(Continued)

OTHER PUBLICATIONS

International Search Report form the European Patent Office in corresponding International Application No. PCT/IT2020/050307 mailed Mar. 18, 2021.
(Continued)

*Primary Examiner* — Andre J Allen
(74) *Attorney, Agent, or Firm* — Finnegan, Henderson, Farabow, Garrett & Dunner, L.L.P.

(57) ABSTRACT

Tyre (1) for motor-cycles comprising a monitoring device (10) fixed onto the inner surface (2) of the tyre (1) at a crown portion (16), wherein the monitoring device (10) comprises a flexible support (13) in single body on which an electronic unit (11) and an electric power supplier (12) are fixed, wherein the electronic unit (11) comprises: at least one sensor for detecting at least one of the following physical quantities: temperature, pressure, acceleration, deformation; a processing unit; a transceiver.

15 Claims, 4 Drawing Sheets

(58) Field of Classification Search
CPC . B60C 23/0433; B60C 23/0493; B60C 19/00; B60C 23/04; B60C 23/041; B60C 23/20; B60C 23/0411; B60C 23/0462; B60C 23/0444; B60C 23/0479; B60C 23/064; B60C 11/24; B60C 23/0488; B60C 23/007; B60C 23/062; B60C 11/246; B60C 23/0401; B60C 23/0413; B60C 23/06; B60C 23/043; B60C 23/0452; B60C 23/0467; B60C 23/0498; B60C 23/02; B60C 99/006; B60C 23/0428; B60C 23/0442; B60C 2019/004; B60C 23/009; B60C 23/0425; B60C 11/243; B60C 23/00354; B60C 23/004; B60C 23/045; B60C 23/0464; B60C 23/003; B60C 23/00318; B60C 23/0472; B60C 23/066; B60C 23/00372; B60C 23/0403; B60C 23/04985; B60C 23/0406; B60C 29/02; B60C 11/00; B60C 23/006; B60C 23/0454; B60C 23/00; B60C 23/044; B60C 23/0455; B60C 23/008; B60C 23/0483; B60C 23/0461; B60C 23/0489; B60C 23/0474; B60C 23/0415; B60C 23/0491; B60C 29/064; B60C 25/002; B60C 23/00363; B60C 23/0481; B60C 23/0459; B60C 23/0471; B60C 11/0318; B60C 2200/02; B60C 23/002; B60C 23/0476; B60C 2019/005; B60C 23/042; B60C 23/0477; B60C 23/0405; B60C 23/0422; B60C 23/0423; B60C 23/0466; B60C 13/001; B60C 29/06; B60C 23/0437; B60C 23/0447; B60C 25/132; B60C 23/0427; B60C 23/0449; B60C 25/00; B60C 9/18; B60C 23/0484; B60C 23/0486; B60C 23/065; B60C 13/00; B60C 19/003; B60C 23/00336; B60C 23/08; B60C 17/00; B60C 2019/006; B60C 23/001; B60C 23/00345; B60C 25/142; B60C 17/02; B60C 23/0445; B60C 29/00; B60C 5/004; B60C 11/0083; B60C 25/145; B60C 9/02; B60C 11/0332; B60C 23/0457; B60C 25/18; B60C 99/00; B60C 11/13; B60C 23/0418; B60C 23/0469; B60C 23/12; B60C 29/066; B60C 23/0432; B60C 23/068; B60C 25/005; B60C 25/138; B60C 11/03; B60C 23/005; B60C 25/007; B60C 3/00; B60C 5/14; B60C 11/11; B60C 17/04; B60C 17/06; B60C 23/0435; B60C 23/063; B60C 23/10; B60C 25/0554; B60C 25/14; B60C 29/062; B60C 99/003; B60C 11/032; B60C 11/12; B60C 13/003; B60C 15/06; B60C 19/001; B60C 23/126; B60C 23/127; B60C 23/16; B60C 29/005; B60C 29/068; B60C 3/04; B60C 9/20; B60C 11/01; B60C 11/0302; B60C 13/02; B60C 25/056; B60C 29/04; B60C 5/142; B60C 11/0304; B60C 11/0306; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/131; B60C 23/135; B60C 23/137; B60C 23/18; B60C 25/02; B60C 1/0016; B60C 11/02; B60C 17/0009; B60C 19/002; B60C 19/08; B60C 19/12; B60C 2019/007; B60C 23/00347; B60C 25/05; B60C 5/001; B60C 5/22; B60C 1/0008; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/04; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 9/005; B60C 9/1807; B60C 9/28; B60C 11/0041; B60C 11/04; B60C 2009/0276; B60C 2011/0033; B60C 2011/0346; B60C 2015/0617; B60C 2015/0678; B60C 2015/0682; B60C 23/085; B60C 25/0548; B60C 25/185; B60C 7/105; B60C 7/107; B60C 7/12; B60C 9/22
USPC .................................................. 73/146–146.8
See application file for complete search history.

(56) References Cited

U.S. PATENT DOCUMENTS

| | | |
|---|---|---|
| 5,749,984 A | 5/1998 | Frey et al. |
| 5,960,844 A | 10/1999 | Hamaya |
| 5,977,870 A | 11/1999 | Rensel et al. |
| 6,217,683 B1 * | 4/2001 | Balzer ................ B60C 23/0493 156/60 |
| 8,525,658 B2 * | 9/2013 | Hirabayashi ........ B60C 23/0493 73/146 |
| 11,780,276 B2 * | 10/2023 | Puppi .................. B60C 23/0493 73/146 |
| 2007/0013503 A1 | 1/2007 | Chien et al. |
| 2008/0303634 A1 | 12/2008 | Toyofuku et al. |
| 2009/0134710 A1 | 5/2009 | Tyndall et al. |
| 2010/0007477 A1 | 1/2010 | Wilson et al. |
| 2010/0271191 A1 | 10/2010 | de Graff et al. |
| 2011/0074564 A1 | 3/2011 | Hirabayashi et al. |
| 2014/0118134 A1 | 5/2014 | Won |
| 2015/0097662 A1 | 4/2015 | Yu et al. |
| 2017/0250633 A1 | 8/2017 | Moiraghi et al. |
| 2020/0215858 A1 | 7/2020 | Shibata et al. |

FOREIGN PATENT DOCUMENTS

| | | |
|---|---|---|
| DE | 10 2012 007071 A1 | 10/2013 |
| EP | 2 301 770 A2 | 3/2011 |
| WO | WO 2007/048621 A1 | 5/2007 |
| WO | WO 2007/121768 A1 | 11/2007 |
| WO | WO 2013/098711 A1 | 7/2013 |
| WO | WO 2013/098712 A1 | 7/2013 |
| WO | WO 2016/042580 A1 | 3/2016 |
| WO | WO 2018/065846 A1 | 4/2018 |
| WO | 2019/021730 A1 | 1/2019 |
| WO | WO 2020/121151 A1 | 6/2020 |

OTHER PUBLICATIONS

Written Opinion of the International Searching Authority from the European Patent Office in corresponding International Application No. PCT/IT2020/050307 mailed Mar. 18, 2021.

(56) References Cited

OTHER PUBLICATIONS

Notification of the First Office Action issued by the China National Intellectual Property Administration on Jun. 20, 2023, in corresponding Application No. CN 202080083956.6 (6 pages).

* cited by examiner

TYRE FOR MOTOR-CYCLES COMPRISING A MONITORING DEVICE

This application is a national stage filing under 35 U.S.C. § 371 of International Application No. PCT/IT2020/050307, filed on Dec. 14, 2020, which claims the benefit of priority to Italian Application No. 102019000024691, filed on Dec. 19, 2019; the disclosure of each of these applications are each incorporated herein by reference in their entirety.

TECHNICAL FIELD OF THE INVENTION

The present invention relates to a tyre for motor-cycles comprising a monitoring device, for example able to detect at least one physical quantity among temperature, pressure, deformation and acceleration.

STATE OF THE ART

Typically, a tyre has a substantially toroidal structure around a rotation axis thereof during operation, and it has an equatorial plane perpendicular to the rotation axis, said equatorial plane being typically a plane of (substantial) geometric symmetry (e.g. neglecting any minor asymmetries, such as the tread design and/or the sides writings and/or structure or profile asymmetries).

A tyre typically comprises a support structure and a tread band arranged in radially outer position with respect to the support structure and destined to entail the adherence of the tyre to the asphalt.

More particularly, the tyres for motor-cycles typically have a high transversal curvature, so that to offer a suitable contact surface with the road when the motor-cycle is inclined during cornering.

By "tyre for motor-cycles" it is meant a tyre having a high curvature ratio (typically greater than the one of motor-vehicles) in particular greater than 0.200, more preferably greater than or equal to 0.250, so that high camber angles can be reached during the cornering of the motor-cycle. In case the tyre is destined to be mounted on wheels for sport uses, the curvature ratio can be higher than 0.300. Such curvature ratio is typically less than or equal to 0.800, preferably less than or equal to 0.500, even more preferably less than or equal to 0.400.

Figure 1:
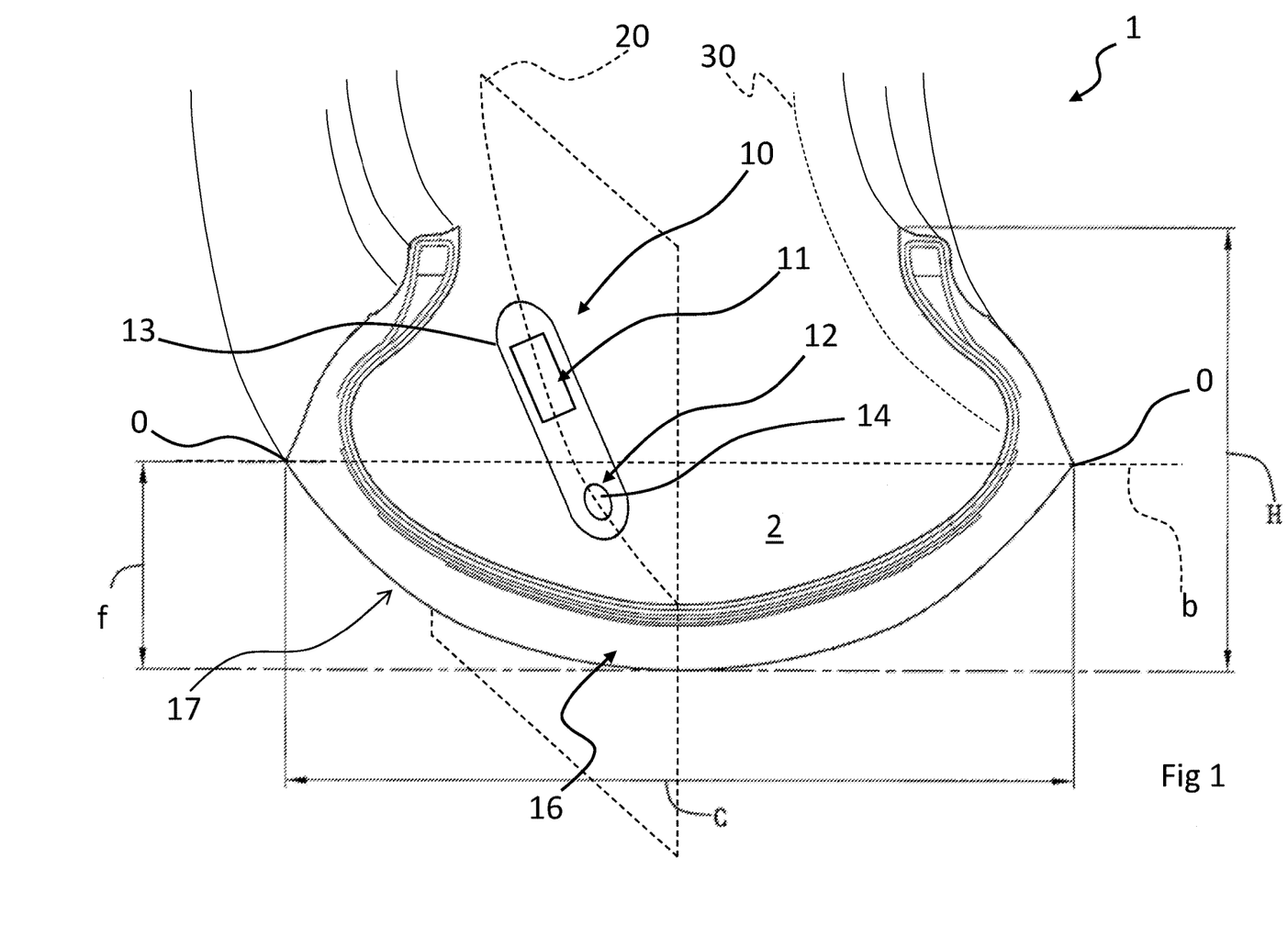
FIG. 1 shows a schematic, perspective and partial view of a tyre for motor-cycles section comprising a monitoring device according to the present invention.

By "curvature ratio" it is meant, with reference to the herein attached FIG. 1, the value of the transversal curvature of the tyre, the transversal curvature being defined by the value of the ratio (f/C) between the distance f, measured on the equatorial plane 20 of the ridge of the tread band from the line b passing through the end points 0 of the tread band 17 and the distance C between said end points 0 of the tread band 17. If the end points of the tread band are not easily spottable, for example for the lack of a precise reference such as the points 0 in FIG. 1, the distance C is the measure of the maximum cord of the tyre, By "camber angle" it is meant the angle between the equatorial plane of the tyre mounted on the wheel of the motor-cycle and a plane perpendicular to the road.

By "inner cavity" it is meant the space delimited by the inner surface of tyre and by the surface of the mounting rim which faces towards the inner surface of the tyre, when mounted.

By "crown portion" it is meant the tyre portion placed at the tread band.

The terms "radial" and "axial" are used with reference respectively to a direction substantially (e.g. within ±5°-10° perpendicular and to a direction substantially (e.g. within ±5°-10° parallel to the rotation axis of the tyre.

The term "tangential" is used with reference to a direction generally oriented substantially (e.g. within ±5°-10°) according to the rolling direction of the tyre, perpendicular to both the radial direction and the axial direction.

By "footprint" it is meant the portion of outer surface of the tread band which, during the rolling of the tyre mounted and subjected to a load (for example due to effect of the weight of the motor-cycle or of the driver), is at each moment in contact with the rolling surface. The footprint typically has a substantially null curvature, or in any case it substantially assumes the conformation of the rolling surface.

By "electric power supplier" it is meant a component for supplying electric power to the electronic unit of the monitoring device. The supplier can consist for example of one or more electric energy accumulators, wherein the energy to be supplied is pre-accumulated (e.g. batteries or capacitors), or it can contain, in combination or not with one or more accumulators, an in situ electric power generator and/or in situ electric power receiver suitable for directly supplying the electronic unit and/or for recharging the accumulators (for example a transducer of mechanical energy in electric energy, or "energy scavenger" or "harvester", or an electromagnetic induction receiver).

There have been proposed tyres for vehicles, in particular for motor-vehicles, comprising monitoring devices of one or more physical quantities arranged in the inner cavity of the tyre, for example as described in US2014/0118134A1; U.S. Pat. Nos. 4,862,486; 5,749,984; 5,960,844; 5,977,870; US2008/0303634A1; US2009/0134710A1; US2010/0007477A1, DE102012007071A1, WO2007/121768A1, WO2007/048621A1, WO2013/098711A1, WO2013/098712A1, WO2018/065846A1, US2007/0013503A1, US2010/0271191A1, US2015/0097662A1.

SUMMARY OF THE INVENTION

For the driver of a motor-cycle, especially during sporty driving or in any case in demanding driving conditions due to speed and/or road features (e.g. curving road), it is extremely important to know, in addition to the inflation pressure, the actual temperature of the front and rear tyres. In fact, the tyre performances (in particular the grip) strongly depend on the temperature, in particular on the temperature of the tread. Therefore, the driver can adjust his driving as a function of such temperature information, for example based on whether or not it is reached a threshold temperature above which the tyres provide adequate performances, for example, for a sporty driving or a fully safe driving in case of unfavourable environmental driving conditions.

The Applicant has realized that in this context it is preferable detecting the temperature as close as possible to the inner surface of the crown portion, since in this way it is acquired a datum close to the actual temperature of the tyre tread material, which is a critical element for the tyre own performances. On the contrary, the temperature for example close to the rim or the temperature of the fluid present in the inner cavity can be very different from the temperature of the inner surface of the crown portion (and therefore of the tread). Furthermore, when the temperature is acquired for example close to the rim or the inflation valve, the detected data is influenced by the temperature of the environment outside the wheel due to the heat conduction and/or the presence of external heat sources such as air flows coming from the radiators or from the brake discs.

The Applicant has therefore faced the problem of making a monitoring device suitable for being fixed onto the inner surface of the crown portion of a tyre for motor-cycles.

For the making of monitoring device for pressure and temperature, a PCB ('Printed Circuit Board') technology is typically used, based on a rigid support, on which the circuit tracks (electrically conductive metallic tracks) are printed and the electronic components are fixed through the respective electric connections (e.g. "pin") by welding and, possibly, adhesives. In this way the electric and mechanical connections between the various electric and electronic components and the rigid support are made. Typically, the rigid support (PCB) comprises one or more layers of a base material, such as glass fibre, impregnated with a (e.g. epoxy) resin.

Furthermore, for the operation of the monitoring device it is usual providing an electric energy accumulator/generator. For example, a (e.g. coin cell) battery comprising a metal capsule can be typically used. This electric energy accumulator/generator typically has a significant weight. For example, a non-rechargeable coin cell battery of the CR2032 type, with electric charge of about 200-250 mAh, has mass of about 3 g.

The main tendency for the preparation of monitoring device suitable to be installed onto the inner surface of tyres for motor-vehicles is to make the overall monitoring device as compact as possible. For example, a known solution envisages to superimpose on each other the accumulator and the PCB, suitably connected, with all the electronic components fixed on them, and to encapsulate the whole with an encapsulating material (e.g. polymeric resin), possibly inside a rigid containment body. In these situations, the support or the rigid board PCB is interposed between the electronic components and the accumulator, with the latter in more proximal position to the inner surface with respect to the electronic components. Furthermore, a housing can be provided (for example made of elastomeric material) for coupling the device to the surface of the tyre. The coupling can be made by a piece for attachment to the surface of the tyre and/or one or more adhesives. The set of these structures (rigid support, containment body, encapsulant, housing, adhesive/s) entails a weight increase, for a total overall mass of the whole monitoring device which can reach 8-15 g, almost all located in a small area, equal to the plan area of the container (for example inscribed in a circle with diameter of 18-30 mm).

The Applicant, in carrying out tests with a monitoring device thus made and fixed onto the inner surface of the crown portion of tyres for motor-cycles, has found the following problems.

First of all, in the aforesaid monitoring device the actual temperature sensor is at a certain distance from the inner surface of the tyre (typically made by the liner). Furthermore, between the temperature sensor and the inner surface various elements are interposed, including the rigid board, the accumulator, the encapsulating material and possibly part of the housing, which, during the rolling of the tyre, heat the environment inside the device. Therefore, the temperature detected by the sensor undergoes a "flywheel" effect such that it can be significantly different from the actual temperature of the inner surface, and therefore of the tread.

Furthermore, the (flat) face of the monitoring device for the attachment onto the inner surface of the tyre is relatively wide and therefore it does not well adapt to the very curved inner surface (both in axial and tangential direction) of a tyre for motor-cycles. The Applicant has verified the onset of adhesion problems, with the monitoring device which tends to detach. To overcome this problem, the attachment surface of the monitoring device could be made curve, but in this way the curvature should be tailor-made on the transversal and tangential curvature of the target tyre, with consequent industrial complexity in terms of production and application to the tyre. Furthermore, the encapsulating material and/or the housing should be highly deformable, at least at the attachment face, to conform themselves to the geometry changes caused by the passage of the device at the footprint area, with a further increase of the aforesaid problems about to the heat generated inside the device.

Furthermore, the overall mass of the monitoring device, placed at the inner surface of the tyre and therefore with an arm relatively long with respect to the rotation axis, produces a balance alteration during rotation of the wheel (consisting of tyre and rim), which is significant as a consequence of the reduced weight of the tyres for motor-cycle. This masses unbalance during rotation can cause an unpleasant driving experience for the driver, up to compromise the driving safety of the motor-cycle. This problem is exacerbated by the overall mass localization of the device in a portion of limited area.

The Applicant has therefore faced the problem of providing a tyre for motor-cycles with a monitoring device of at least one physical quantity, preferably of the temperature, applied onto the inner surface of the crown portion of the tyre, which is able to maintain a strong and durable adhesion of the device onto the inner surface, while limiting the masses unbalance during rotating of the tyre in use.

To overcome one or more of these drawbacks, the Applicant has conceived a monitoring device according to the present invention, in which the electronic unit and the electric power supplier are both fixed onto a flexible support.

According to the Applicant, this solution causes the overall mass of the monitoring device to be reduced, due to the elimination of a component with significant mass such as the rigid board (PCB), as well as of the encapsulating material and of the housing, with advantages in terms of reduction of the above described masses unbalance during rotation.

Furthermore, in the monitoring device the power supplier and the electronic unit can be separately fixed onto the flexible support. More specifically, at least part of the (preferably the whole) electronic unit and the power supplier can be arranged so that not being radially superimposed. In this way the overall mass of the monitoring device is divided into at least two parts with non-negligible mass with respect to the overall mass of the device. The mass which insists on a respective single localized crown portion of the tyre is thus reduced, with a consequent further reduction of the aforesaid rotational unbalance.

Furthermore, since the electronic unit (comprising the sensor) can be fixed onto the flexible support without the interposition of the electric power supplier (e.g. the accumulator), the sensor is close to the inner surface and it detects a temperature very close to the actual one of the inner surface, and therefore of the tread, thanks also to the fact that the flexible support is typically thin and rapidly reaches the thermal equilibrium with the inner surface of the tyre.

The flexible support also adapts to the curvature of the inner surface of the crown portion, with advantageous effects in terms of adhesion strength and/or duration.

According to an aspect the invention relates to a tyre for motor-cycles comprising a monitoring device fixed onto an inner surface of said tyre at a crown portion of said tyre.

The monitoring device comprises an electronic unit and an electric power supplier for supplying said electronic unit.

The electronic unit comprises: at least one sensor for detecting at least one of the following physical quantities: temperature, pressure, acceleration, deformation; a processing unit; a transceiver.

The monitoring device further comprises a flexible support in single body, wherein said electronic unit and said electric power supplier are fixed on said flexible support.

For the purposes of the present description and of the following claims, by "flexible support" it is generally meant a support made of a material (including a composite/layered material) which, if used for the making of a square-shaped plate with side significantly greater than the circumferential extension of the entry or exit area from the footprint area of a tyre (for example a plate with surface of 120 mm×120 mm) and with thickness equal to the support, allows this plate to conform—at ambient temperature—to a cylindrical surface with lower radius than the normal curvature radius of a tyre inflated to its nominal pressure (e.g. a cylindrical surface with radius of 200 mm, preferably 100 mm, more preferably 50 mm) without breaking or undergoing permanent deformation.

The present invention can have one or more of the following preferred features.

Preferably an equatorial plane of said tyre crosses, or passes close to, said electronic unit, more preferably it crosses, or passes close to, said sensor. In this way the temperature is detected in the middle of the tread band.

Preferably an equatorial plane of said tyre crosses, or passes close to, said electric power supplier.

In fact, the Applicant has observed that, in certain conditions relatively to the geometric shape of the device and/or of the tyre, to the materials, to the operating conditions, etc., when a massive component is arranged substantially far from the equatorial plane, the monitoring device of the present invention, in particular the flexible support, can deform collapsing towards the equatorial plane. For example, in one embodiment of a monitoring device according to the present invention comprising two accumulators arranged on opposite end of a flexible support with elongated shape and arranged perpendicularly to the equatorial plane (so that the two accumulators are far from the equatorial plane), the ends of the flexible support can move towards the equatorial plane, forming a fold, or curl, in the flexible support. Such fold can mainly form in a central portion of the flexible support.

According to the Applicant, without restricting to any theory, this phenomenon originates from the centrifugal force to which the massive parts of the monitoring device are subjected (typically the electric power supplier or parts thereof), arranged relatively far from the equatorial plane, in particular when during the rotation they are out of the footprint and possibly also entering and exiting the footprint. This centrifugal force (with radial direction), due to the high transversal curvature of the tyre for motor-cycles, has a component directed tangentially to the inner surface and facing towards the equatorial plane and therefore it tends to push the massive parts along the inner surface towards the equatorial plane.

This can first of all generate stresses on the contact/adhesion surfaces between the massive parts and the support and between the support and the inner surface, with the possibility of detachment and/or loss of structural and/or electric integrity of the monitoring device.

Furthermore, the flexible support is subjected to deformation forces that can produce the aforesaid fold or curl in the flexible support, and this happens the more the support is non-deformable under compression.

The formation of such fold, especially in the center of the flexible support, i.e. wherein electronic components and/or electric connection circuits can typically be found, can lead, especially with prolonged use, to an interruption of the electric connections and/or a malfunction of the devices.

The aforesaid positioning of the electronic unit and/or of the electric power supplier onto, or close to, the equatorial plane allows arranging one or more of the most massive components of the device (e.g. the electric power supplier, the accumulator/s, the electronic unit, etc) in the bottom region of the transversal curvature of the inner surface of the tyre in a section passing through the rotation axis of the tyre. In this way, no forces, or minimal forces, are generated that push these massive components along this curvature towards the equatorial plane. This therefore allows strongly reducing or completely cancelling the onset of the aforesaid stresses on the contact/adhesion surfaces between the massive components and the support and between the support and the inner surface, and/or the formation of the aforesaid fold.

Consistently with the above, by the expression "equatorial plane passing close to an element" it is meant that said element is positioned so that the component of the centrifugal acceleration acting on the element and directed tangentially to the inner surface towards the equatorial plane, is substantially null or negligible.

For example, the distance of said element from said equatorial plane is less than or equal to 25 mm, more preferably less than or equal to 15 mm.

Preferably the flexible support has a plan view with elongated shape along a main development direction.

By "main development direction" it is meant the direction along which the flexible support has the greater dimension when undeformed.

Preferably the monitoring device is fixed onto the inner surface of the tyre for motor-cycles so that the main development direction of the flexible support, and/or a direction passing through the center of mass of the accumulators, forms an angle with a direction parallel to the equatorial plane less than or equal to 45°, more preferably less than or equal to 30°, even more preferably less than or equal to 20°. Preferably the main development direction of the flexible support is parallel to the equatorial plane of the tyre. In this way the massive components are easily kept close to the equatorial plane.

Preferably a length of the flexible support along said main development direction is greater than or equal to 50 mm, more preferably greater than or equal to 70 mm, and/or less than or equal to 140 mm, more preferably less than or equal to 130 mm. The Applicant has verified that such lengths suffice to allow efficiently distributing the masses of the electric and electronic components without making the overall device excessively long and/or bulky.

Preferably an aspect ratio R between a length of the flexible support along said main development direction and a width along a direction orthogonal to the main development direction is greater than or equal to 1.5, more preferably greater than or equal to 2, even more preferably greater than or equal to 2.5, and/or less than or equal to 6, more preferably less than or equal to 5. These values of the aspect ratio offer a surface sufficient for an efficient mass distribution.

Preferably said electric power supplier comprises at least one electric energy accumulator electrically connected to said electronic unit for supplying said electronic unit, said accumulator being fixed onto said flexible support.

By 'accumulator' it is meant an electrochemical device wherein the electric power to be supplied is pre-accumulated so that, once connected to an external electric circuit, it is able to supply electric power. Typical example of accumulator is an electric battery.

Preferably said electric power supplier (more preferably said at least one accumulator) and said electronic unit are distributed along said main development direction (in other words the main development direction passes through both the electronic unit and the power supplier, for example through the respective center of mass). In this way it is possible positioning the supplier and the electronic unit at a mutual distance, exploiting the elongated shape of the flexible support, so that to distribute the masses.

Preferably said electric power supplier comprises a plurality of electric energy accumulators, each accumulator being electrically connected to said electronic unit and being suitable for supplying said electronic unit, wherein each of said accumulators is fixed onto said flexible support.

The presence of a plurality of electric energy accumulators distinct from each other and individually fixed onto the flexible support means that the accumulators are not—not even partially—radially superimposed one another. They also are not—not even partially—radially superimposed on the electronic unit given that the electronic unit is also fixed onto the flexible support. In this way the overall mass of the power supplier is divided into at least two parts (the accumulators), each part having a non-negligible mass with respect to the overall mass of the device. In this way, the mass that insists on a single localized crown portion of the tyre is reduced: this entails a reduction of the consequent rotational unbalance.

Preferably said accumulators are distributed along said main development direction (in other words the main development direction passes through each accumulator, for example through the respective center of mass). In this way it is possible positioning the accumulator at a mutual distance, exploiting the elongated shape of the flexible support.

Preferably an equatorial plane of said tyre crosses, or passes close to, said at least one electric energy accumulator or each of said electric energy accumulators. In this way each accumulator is substantially not subjected to components of the centrifugal force directed towards the equatorial plane.

Preferably said plurality of accumulators comprises two accumulators arranged on opposite sides of said electronic unit. By interposing the electronic unit between the two accumulators, the latter are placed at a mutual distance greater than a positioning on a same side of the electronic unit, for given overall length of the monitoring device Preferably said plurality of accumulators comprises two and no more than two accumulators. In this case the plan encumbrance and the complexity of the monitoring device are limited.

Preferably said two accumulators are arranged at longitudinally opposite ends of the monitoring device. This embodiment has proved to be rational and particularly efficient entailing the integrity of the monitoring device. For example, since the accumulators (i.e. the typically heavier parts of the device) are placed in peripheral or end position of the flexible support, the mechanical stress and the relative deformation produced by the accumulators onto the flexible support in the region of the circuits and of the electronic unit (placed substantially in the central region of the flexible support) are limited, enhancing the operation of the device.

Preferably each of said accumulators is an electric battery (for example a coin cell battery), more preferably non-rechargeable.

Preferably each of said accumulators has circular plan view.

Preferably each of said accumulators comprises a rigid housing, for example made of metal.

Preferably each of said accumulators has a charge capacity greater than or equal to 30 mAh, more preferably greater than or equal to 80 mAh even more preferably greater than or equal to 100 mAh.

Typically, each of said accumulators has a weight greater than or equal to 0.5 g, more preferably greater than or equal to 1 g. Preferably each of said accumulators has a weight less than or equal to about 4 g.

Preferably each of said accumulators is inscribed in a circle having diameter less than or equal to 30 mm, more preferably less than or equal to 25 mm, and/or circumscribed to a circle having diameter greater than or equal to 15 mm, more preferably greater than or equal to 17 mm.

These types of accumulators are able to supply sufficient energy for the operation of the device even on time period compatible with the average life of a tyre (according to its different uses), and/or even in presence of complex functionality of the device, such as the detection of different parameters.

Preferably each of said accumulators is structured to withstand temperatures greater than or equal to 100° C., more preferably greater than or equal to 110° C. In this way the accumulators withstand the overheating temperatures of the tyre.

In one alternative embodiment, each accumulator has a plan surface greater than or equal to 500 $mm^2$, preferably greater than or equal to 600 $mm^2$, even more preferably greater than or equal to 700 $mm^2$, and/or a thickness less than or equal to 1.5 mm, preferably less than or equal to 1.0 mm. In this embodiment, preferably each accumulator has a weight less than or equal to 3 g, more preferably less than or equal to 2 g.

By "plan surface" of an element it is meant the surface extension of the element in plan view (i.e. seen perpendicularly to the inner surface of the tyre), possibly excluding secondary offshoots such as the electric contacts ("pin") of an accumulator.

By "thickness" of an element it is meant the length along a direction perpendicular to the inner surface of the tyre (in other words perpendicular to the plane on which the plan surface is taken).

In the aforesaid embodiment, each accumulator has a length along a first plan direction greater than or equal to 15 mm, more preferably greater than or equal to 20 mm, and/or less than or equal to 40 mm.

Preferably each accumulator has a width along a second plan direction orthogonal to the first direction greater than or equal to 20 mm, more preferably greater than or equal to 25 mm, and/or less than or equal at 60 mm. These dimensions have been proven particularly suitable for the mass distribution.

Preferably, in the aforesaid embodiment said accumulator is, typically plastically (i.e. non elastically), foldable. In this way the accumulator can, even instantaneously, adapt to the conformation of the inner surface onto which it is attached. For the purposes of the present description and the following claims, by "foldable accumulator" it is generally meant an accumulator able to conform—at ambient temperature—to a cylindrical surface with lower radius than the normal curvature radius of a tyre inflated to its nominal pressure (for example a cylindrical surface of radius 200 mm, preferably 100 mm, more preferably 50 mm) without losing functionality or with a functionality loss not greater than 10% (for example in terms of supplied voltage and/or stored capacity) and keeping the ability to recover the original shape when it undergoes an opposite action.

Preferably, in the aforesaid embodiment said accumulator (typically in number equal to one) is interposed between said flexible support and said inner surface of the tyre. In this way the accumulator acts as structural support for the device, thanks to the wide surface available.

Typically, the monitoring device comprises an electric connection circuit for connecting the accumulation device to said electronic unit, wherein said electric connection circuit comprises at least two separate electric paths (one for the connection to the positive pole and one for the connection to the negative pole of the accumulators).

Preferably said accumulators are electrically connected to said electronic unit in parallel. In this way the capacity of the accumulators adds up, obtaining a lengthening of the monitoring device life and/or an increase of the monitoring functionality.

Preferably the electric connection circuit is fixed onto said flexible support, more preferably printed onto said flexible support with a conductive ink, even more preferably printed with serigraphic, lithographic, by ink jet, etc. technology. In one embodiment the electric connection circuit comprises copper conductive tracks, preferably obtained by chemical etching of a thin layer (e.g. few microns or few tens of microns) of copper. These technologies are particularly suitable for flexible supports and are able to create conductive tracks resistant to flexions.

Preferably a distance between each pair of accumulators is greater than or equal to 40 mm, more preferably greater than or equal to 50 mm. By "distance" it is meant the length of the shortest line on the inner surface of the tyre (in undeformed state) connecting the edges of the two considered accumulators (e.g. the edges of a housing of the accumulator).

Preferably said distance between each pair of accumulators is less than or equal to 250 mm, more preferably less than or equal to 200 mm, even more preferably less than or equal to 150 mm. In this way the length of the electric connection circuit and/or the extension of the overall device are limited, and the consequent complications in terms of manufacturing, coupling (gluing) to the tyre, structural resistance of the conductive tracks, etc. are reduced.

Preferably said at least one sensor is suitable for detecting at least two of the following physical quantities: temperature, pressure, deformation, acceleration, for example temperature and pressure, more preferably at least the temperature.

Preferably said flexible support is substantially inextensible. In this way the shear stresses are distributed and/or the stresses on the tracks of the connection circuit are limited.

For the purposes of the present description and of the claims that follow, by "non extensible support" it is generally meant a support of thickness comprised between about 10 μm and about 400 μm, preferably between about 50 μm and about 200 μm, made with a material (including a composite/layered material) having tensile elastic modulus preferably higher than 0.1 GPa, more preferably 0.5 GPa, at 23° C.

Preferably said flexible support is a film of an elastomeric or thermoplastic material selected in the following group: nylon, PET, PEN, polyimide, EPDM, diene polymers and polyurethane resins. Paper substrates, thin sheets in epoxy resin (possibly reinforced, for example with fiberglass) or super-thin and therefore flexible silicon sheets (or another semiconductor) can also be used. These flexible supports have proved to be suitable for technologies in which the electric connection circuit is printed or deposited or chemically etched onto the flexible support, and the pre-fabricated electronic components are fixed, and electrically connected, to the electric connection circuit by gluing with conductive adhesives (for example adhesives loaded with conductive particles such as silver, copper or carbon particles) and/or welding, for example with tin or alloys thereof (for example tin-bismuth).

Preferably one or more of said at least one sensor, said processing unit and said transceiver is a pre-fabricated electronic component. This pre-fabricated electronic component can be (directly) fixed, and electronically connected, to the electric connection circuit, for example by gluing with conductive adhesives and/or welding.

In one embodiment one or more of said at least one sensor, said processing unit and said transceiver is directly made in situ onto the flexible support (i.e. it is not pre-fabricated), for example by printing or deposition technologies.

Preferably at least two of said sensor, said processing unit and said transceiver, more preferably all three, are arranged in a single assembly, preferably pre-fabricated (for example by means of a containment body which at least partially houses said at least two of said sensor, said processing unit and said transceiver).

In this way the making of the monitoring device is significantly simplified.

Preferably the tyre comprises an adhesive layer arranged between said flexible support (and/or said foldable accumulator) and said inner surface for fixing said monitoring device to inner surface. Preferably said electric power supplier and/or said electronic unit is/are fixed onto said flexible support on the opposite side of said inner surface.

This has allowed obtaining optimal adhesive conditions of the monitoring device to the inner surface of the tyre, without significant detachments, even in presence of inextensible support.

In a first embodiment, the adhesive layer is an acrylic double-sided tape comprising a viscoelastic acrylic foam with a thickness equal to or greater than 0.4 mm. Useful examples are represented by the 3M™ VHB™ adhesive tapes of the 4941 family, of the 4956 family and of the 5952 family, or by the 3M™ adhesive tapes of the RP45 family and of the RP62 family, or by the Nitto Hyperjoint adhesive tapes of the H8004-H8008-H8012-H9004-H9008-H9012 family. These tapes consist of a conformable acrylic foam which is adhesive on both sides. In order to increase the adhesion, a PSA acrylic adhesive (for example, the 3M™ 9469, 3M™ 468, 3M™ 93430 or Nitto 5925 adhesives) can be further applied to one or both the surfaces of the aforesaid tapes.

Alternatively, the first adhesive layer may be an acrylic double-sided tape comprising a substrate of expanded (or even in gel form) polymeric material with a thickness equal to or greater than about 0.4 mm, such as for example an expanded EPDM rubber or an expanded polyurethane, made double-sided by means of acrylic adhesive layers spread on both surfaces of the substrate. Non-limiting examples of expanded EPDM rubber useful for the purposes of the present invention available on the market are represented by layers of expanded EPDM rubber produced by the company Tekspan Automotive, such as for example a layer of EPDM SE30 rubber (for example made double-sided by PSA acrylic adhesives arranged on both the surfaces of the layer). Non-limiting examples of expanded polyurethane useful to the objects of the present invention available on market are represented by layers of expanded polyurethane of the Cirene line produced by the company Cires SpA, such as for example the layers of expanded polyurethane Cirene 20, 25 and 30 (for example made double-sided adhesive by means of PSA acrylic adhesives arranged on both the surfaces of the layer), and by the 3M™ adhesive tapes of the "Double Coated Urethane Foam Tapes" 4004-4008-4016-4026-4032-4052-4056-4085 family.

Further useful examples of first adhesive layer according to the present invention are represented by an acrylic double-sided tape comprising at least one layer of acrylic adhesive layer with a thickness equal to or greater than about 0.4 mm such as, for example, the 3M™ adhesive tapes of the Extreme Sealing 4411 and 4412 family, made double-sided by a PSA acrylic adhesive (for example 3M™ 9469, 3M™ 468, 3M™ 93430 or Nitto 5925 adhesives).

Preferably the monitoring device comprises a protective film (for example a film of polymeric material) for covering and protecting the components of the device (electronic devices, conductive tracks, accumulator/s, etc.). This solution allows obtaining an overall reduction of the mass of the monitoring device with respect to solution with encapsulation by shells and/or protective resins, with a consequent further advantage in terms of reduction of the mechanical stresses generated by the tyre deformation during the rolling.

DETAILED DESCRIPTION OF SOME EMBODIMENTS OF THE INVENTION

The features and advantages of the present invention will be further clarified by the following detailed description of some embodiments, presented by way of non-limiting example of the present invention, with reference to the attached figures.

In FIG. 1 with reference number 1 it is shown a tyre for motor-cycles (in partial perspective section) comprising a monitoring device 10 according to the present invention. The dashed line 30 schematically and arbitrarily indicates the boundaries line between the crown portion 16 (i.e. the portion of the tyre at the tread band 17) and the sidewall of the tyre. In the present description and figures the same reference number is used for the same elements, also for their embodiments.

The tyre 1 for motor-cycles of the present invention has a high transversal curvature (and therefore a high curvature ratio), for example equal to 0.26.

In one embodiment, the tyre 1 for motor-cycles of the invention is a rear tyre having dimension of the cord C substantially comprised between 100 and 160 mm. Preferably the distance f between the radially outer point of the tread and the line b passing through the laterally opposite ends 0 of the tread of the rear tyre is comprised between 30 and 80 mm. Typically, the transversal curvature ratio (f/C) is substantially comprised between 0.20 and 0.50.

In one embodiment, the tyre 1 for motor-cycles of the invention is a tyre for forward-wheel of motor-cycles having dimension of the cord C substantially comprised between 100 and 130 mm. Preferably the aforesaid distance f is comprised between 30 and 65 mm. The ratio of transversal curvature/cord (f/C) can be substantially comprised between 0.20 and 0.60.

Figure 2:
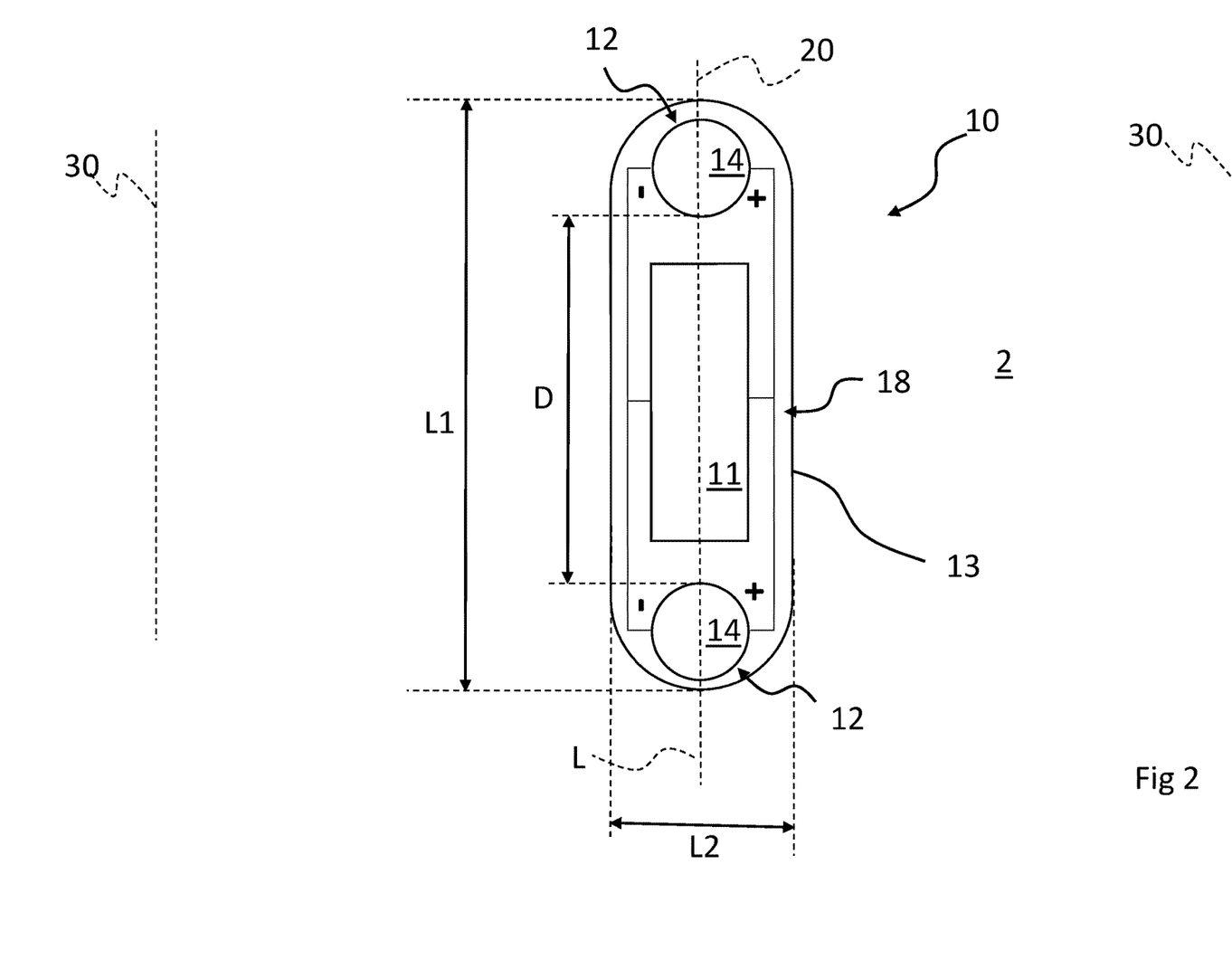
FIGS. 2 and 3 show a plan, schematic, and partial view of the inner surface of the tyre for motor-cycles developed on the figure plane and comprising respective further embodiment of the monitoring device according to the present invention.
Figure 3:
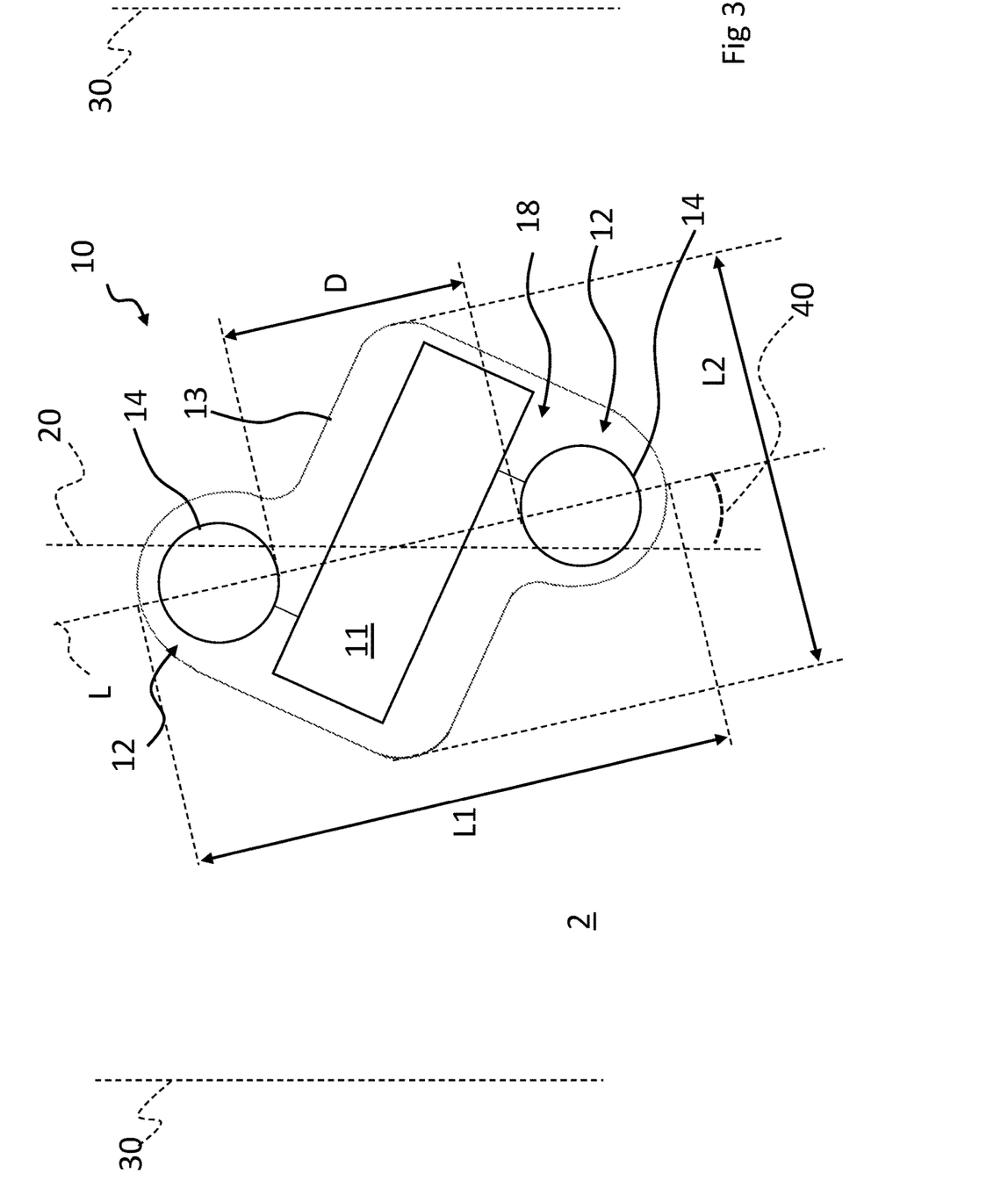

In FIGS. 2 and 3 it is shown a plan view of a portion of inner surface 2 of the crown portion schematically delimited by the directions 30, developed on the lying plane of the figures together with the monitoring device 10. With number 20 the intersection of the equatorial plane with the (plane developed) inner surface 2 of the tyre is shown. All the figures are shown not in scale and with purely illustrative purpose.

The monitoring device 10 comprises an electronic unit 11 and an electric power supplier 12 electrically connected to the electronic unit for its supply.

The monitoring device 10 further comprises a flexible support 13 in single piece, fixed onto an inner surface 2 of the tyre at the crown portion 16 of the tyre 1. The electronic unit and the electric power supplier are both fixed onto the flexible support 13, for example by conductive adhesive (e.g. Henkel 3104 WXL) and/or structural adhesive (e.g. Henkel® LOCTITE® 312™).

Exemplarily the flexible support 13 is a sheet made of polyimide (e.g. Kapton® by DuPont®).

One adhesive layer (not shown), can be arranged for gluing the lower face (opposite to the electronic unit 11) of the flexible support 13 to the inner surface 2 of the tyre, as described above. Exemplarily the adhesive layer is made of a 3M™ VHB™ adhesive tape of the 4941 family, of the 4956 family or of the 5952 family.

The electronic unit 11 comprises (not shown) at least one sensor for detecting at least one of the following physical quantities: temperature, pressure, acceleration, deformation preferably at least the temperature; a processing unit and a transceiver.

As an example, the electronic unit can comprise a prefabricated assembly model FXTH870911DT1 sold by NXP Semiconductors®, comprising a processing unit and a plurality of sensors suitable for detecting all the three physical quantities: temperature, pressure and acceleration. This assembly also comprises an RF transceiver with transceiver frequency of 315-434 Mhz. In one exemplary embodiment, a further transceiver fixed onto the flexible support separately from the aforementioned assembly can be used, the further transceiver being usable on a different frequency band (for example with Wifi or Bluetooth® technology).

Preferably the device 10 is applied onto the inner surface 2 of the tyre so that the equatorial plane 20 of the tyre crosses, or passes close to, the electronic unit 11 (for example it crosses the sensor).

Preferably the electric power supplier 12 comprises at least one electric energy accumulator 14, for example only one as shown in FIG. 1, or, more preferably, as exemplarily shown in FIGS. 2 and 3, a plurality of electric energy accumulators 14 distinct from each other, each accumulator 14 being electrically connected to the electronic unit for supplying the electronic unit. Each accumulator 14 is fixed onto the flexible support 13.

Preferably the equatorial plane 20 crosses, or passes close to, the electric power supplier 12 or each accumulator 14.

Exemplarily each accumulator 14 is an electric battery, for example a coin cell battery of the CR2032HR type sold by Maxell® (capacity 200 mAh, weight 3 g, diameter and thickness 20×3.2 mm), or BR1632A sold by Panasonic® (capacity 120 mAh, 1.5 g, 16×3.2 mm). The typical voltage is equal to 3V, and the operational temperature range is from −40° C. to +125° C. (or possibly subintervals, depending on the expected use).

In one alternative (not shown) embodiment, the accumulator 14 is a primary electric battery (i.e. non-rechargeable), with nominal voltage of 3V, a rectangular-shaped plan view and a maximum thickness of about 0.5 mm. The battery has a casing made of two foldable aluminium sheets and it is foldable itself with no appreciable functionality loss.

In one version, with capacity of 35 mAh and weight=0.61 g, the plan length and width (excluding the contact tabs) are respectively equal to 23 mm and 45 mm, for a plan surface of 1035 mm$^2$.

In one further version, with capacity of 25 mAh and weight=0.43 g, the plan length and width (excluding the contact tabs) are respectively equal to 22 mm and 29 mm, for a plan surface of 638 mm$^2$.

In one (not shown) embodiment, the accumulator is a foldable and thin electric battery fixed onto the flexible support on opposite side with respect to the electronic unit. In other words, in this embodiment the foldable and thin electric battery is arranged, in the monitoring device fixed onto the tyre, between flexible support and inner surface of the tyre.

The monitoring device 10 comprises an electric connection circuit 18 (only schematically shown in FIGS. 2 and 3) for connecting each accumulator 14 to the electronic unit 11. In case of a plurality of accumulators, they are preferably connected in parallel (as exemplarily and schematically shown only in FIG. 2).

In one embodiment, the tracks of the electric connection circuit are made with a conductive ink (e.g. silver conductive ink DuPont® 5025) printed directly onto the flexible substrate 13, for example with serigraphic technique.

Figure 4:
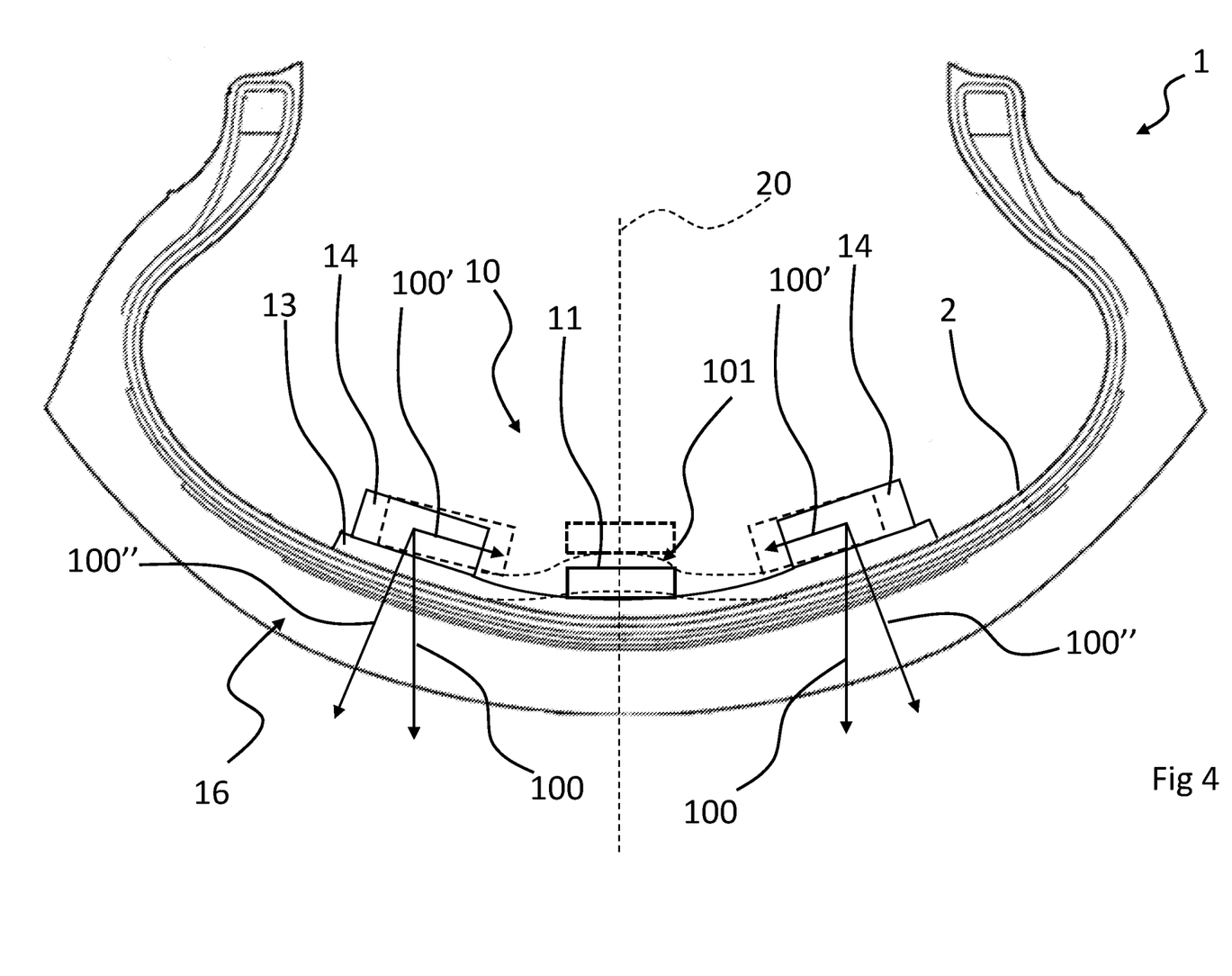
FIG. 4 shows a schematic and partial view of a tyre for motor-cycles section comprising a monitoring device according to the present invention.

In some embodiments, the plurality of accumulators 14 comprises two and no more than two accumulators, more preferably arranged on opposite sides of the electronic unit 11, as exemplarily shown in FIGS. 2, 3 and 4.

The flexible support 13 exemplarily has a plan view with elongated shape along a main development direction L.

Preferably the electric power supplier 12 (more preferably each accumulator 14) and the electronic unit 11 are distributed along the main development direction L (for example the main development direction passes through the respective centres of mass of the electronic unit and of the power supplier/accumulator).

Preferably the two accumulators 14 are arranged at opposite ends of the monitoring device (FIGS. 2, 3 and 4) along the main development line L. Preferably the two accumulators 14 are arranged on opposite sides of the electronic unit 11.

Exemplarily, as schematically shown in figures, the flexible support 13 has plan dimensions L1 and L2 (respectively along such direction L and along the dimension perpendicular to it) different from each other. Exemplarily, in case of the device of FIG. 2, the dimensions L1×L2 are equal to about 110×30 mm (aspect ratio R equal to 3.7) or about 80×25 mm (R equal to 3.2). Exemplarily the distance D between the two accumulators is equal to about 69 mm in case of the dimensions 110×30 mm, while for dimensions equal to 80×25 mm the distance D is equal to about 50 mm.

Exemplarily, in case of the device of FIG. 3, the dimensions L1×L2 are equal to about 80×55 mm (aspect ratio R equal to about 1.5) and the distance D between the two accumulators is equal to about 45 mm.

Preferably, the monitoring device comprises a protective film (not shown) for covering and protecting the components of the device.

FIG. 4 schematically shows a tyre in which the monitoring device 10 (for example in the embodiment described with reference to FIG. 2) is applied onto the inner surface 2 of the tyre so that the two accumulators 14 are substantially distant from the equatorial plane 20 (for example the linear distance of the edge of each accumulator from the equatorial plane 20 is equal to 30 mm, with undeformed device 10). The main development line is oriented perpendicularly to the equatorial plane 20.

The solid line shows the monitoring device 10 (comprising the flexible support 13, the two accumulators 14 and the electronic unit 11) in its undeformed state (for example immediately after the fixing onto the tyre). The arrows 100 schematically show the, radially directed, centrifugal force which is generated during the rotation of the tyre in the out-of-footprint portion and which acts on the masses of each accumulator 14. The reference system herein adopted, for explanatory purposes only, is integral with the monitoring device 10. This centrifugal force 100 can be decomposed into a component 100" perpendicular to the inner surface 2 (which is substantially cancelled by the constraint reaction of the latter) and into a component 100' tangent to the inner surface 2, with direction facing towards the equatorial plane 20. This component 100' of the centrifugal force tends to push each accumulator 14 along the inner surface 2 towards the equatorial plane. In certain conditions, as explained above (for example in case of relatively heavy accumulators 14), this thrust can cause a displacement of the accumulators 14 and/or a deformation of the flexible support 13 which forms a fold 101 and/or a detachment of the accumulators 14 from the flexible support and/or a detachment of the flexible support 13 from the inner surface 2. The dashed line schematically shows the monitoring device 10 in an arbitrary deformed state.

To overcome this drawback, as shown in FIGS. 1, 2 and 3, the monitoring device 10 is preferably fixed onto the inner surface of the tyre 1 so that the main development direction L of the flexible support 13, and/or a direction passing through a center of mass of the accumulators 14, forms with a direction parallel to the equatorial plane 20 of the tyre an angle 40 less than 45°, more preferably less than or equal to 30°, even more preferably less than or equal to 20°. In this way the equatorial plane 20 crosses each accumulator 14.

Exemplarily in FIGS. 1 and 2 this angle 40 is equal to zero (main direction L parallel to the equatorial plane 20), and in FIG. 3 it is equal to about 15°.

The invention claimed is:

1. A tyre for motor cycles comprising a monitoring device fixed onto an inner surface of the tyre at a crown portion of the tyre,
wherein the monitoring device comprises an electronic unit and an electric power supplier for supplying the electronic unit,
wherein the electronic unit comprises: at least one sensor for detecting at least one of the following physical quantities: temperature, pressure, acceleration, or deformation; a processing unit; and a transceiver,
wherein the monitoring device comprises a flexible support in a single body, the electronic unit and the electric power supplier being fixed on the flexible support, and
wherein the tyre has a high curvature ratio.

2. The tyre according to claim 1, wherein an equatorial plane of the tyre crosses, or passes close to, the electronic unit, and the equatorial plane crosses, or passes close to, the sensor.

3. The tyre according to claim 1, wherein an equatorial plane of the tyre crosses, or passes close to, the electric power supplier.

4. The tyre according to claim 1, wherein the flexible support has a plan view with elongated shape along a main development direction (L).

5. The tyre according to claim 4, wherein the monitoring device is fixed onto the inner surface of the tyre for motorcycles so that the main development direction (L) of the flexible support forms an angle with a direction parallel to the equatorial plane, and wherein the angle is less than or equal to 45°.

6. The tyre according to claim 4, wherein a length (L1) of the flexible support along the main development direction (L) is greater than or equal to 50 mm, and/or less than or equal to 140 mm and wherein an aspect ratio between the length (L1) of the flexible support along the main development direction (L) and a width (L2) along a direction orthogonal to the main development direction (L) is greater than or equal to 1.5 and/or less than or equal to 6.

7. The tyre according to claim 1, wherein the electric power supplier comprises at least one electric energy accumulator electrically connected to the electronic unit for supplying the electronic unit, and the accumulator fixed onto the flexible support.

8. The tyre according to claim 4, wherein the electric power supplier and the electronic unit are distributed along the main development direction (L).

9. The tyre according to claim 4, wherein the electric power supplier comprises a plurality of electric energy accumulators, each accumulator electrically connected to the electronic unit and suitable for supplying the electronic unit, wherein each of the accumulators is fixed onto the flexible support, wherein a distance (D) between each pair of accumulators is greater than or equal to 40 mm, and/or less than or equal to 250 mm, and wherein the accumulators are distributed along the main development direction (L).

10. The tyre according to claim 9, wherein an equatorial plane of the tyre crosses, or passes close to, each of the electric energy accumulators.

11. The tyre according to claim 9, wherein the plurality of accumulators comprises two accumulators arranged on opposite sides of the electronic unit, wherein the two accumulators are arranged at longitudinally opposite ends of the monitoring device.

12. The tyre according to claim 7, wherein each of the accumulators is an electric battery having a charge capacity greater than or equal to 30 mAh, a weight greater than or equal to 0.5 g, wherein each of the accumulators is inscribed in a circle having diameter less than or equal to 30 mm, and/or circumscribed to a circle having diameter greater than or equal to 15 mm.

13. The tyre according to claim 7, wherein each accumulator has a plan surface greater than or equal to 500 mm2, a thickness less than or equal to 1.5 mm, a weight less than or equal to 3 g, a length along a first plan direction greater than or equal to 15 mm, and/or less than or equal to 40 mm, a width along a second plan direction orthogonal to the first direction greater than or equal to 20 mm, and/or less than or equal at 60 mm, wherein the accumulator is foldable and wherein the accumulator is interposed between the flexible support and the inner surface of the tyre.

14. The tyre according to claim 1, wherein the monitoring device comprises an electric connection circuit for connecting the electric power supplier to the electronic unit, wherein the electric connection circuit is printed on the flexible support with a conductive ink or the electric connection circuit comprises copper conducting tracks obtained by chemical etching of a thin layer of copper.

15. The tyre according to claim 1, wherein the flexible support is inextensible, wherein the flexible support is a film made of an elastomeric or thermoplastic material selected in the following group: nylon, PET, PEN, polyimide, EPDM, diene polymers and polyurethane resins, or it is selected in the group: paper substrates, thin epoxy resin sheets and super thin and flexible silicon or other semiconductor sheets, wherein the tyre comprises an adhesive layer interposed between the flexible support and the inner surface for fixing the flexible support to the inner surface, the electric power supplier and the electronic unit fixed to the flexible support on the opposite side of the inner surface, wherein the adhesive layer is an acrylic double-sided tape comprising a viscoelastic acrylic foam with a thickness equal to or greater than 0.4 mm, or the adhesive layer is an acrylic double-sided tape comprising a substrate of expanded polymeric material with a thickness equal to or greater than 0.4 mm, or the adhesive layer is an acrylic double-sided tape comprising at least a layer of acrylic adhesive with a thickness equal to or greater than 0.4 mm.

* * * * *